Sept. 13, 1955        J. R. GARDNER        2,717,813
RECOIL SPRING MOUNTING FOR TRACK-TYPE TRACTOR
Filed Feb. 16, 1954                            2 Sheets-Sheet 2
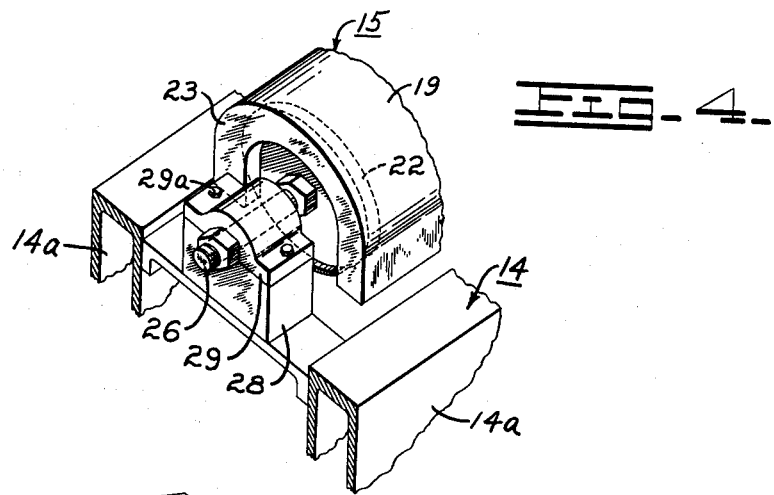
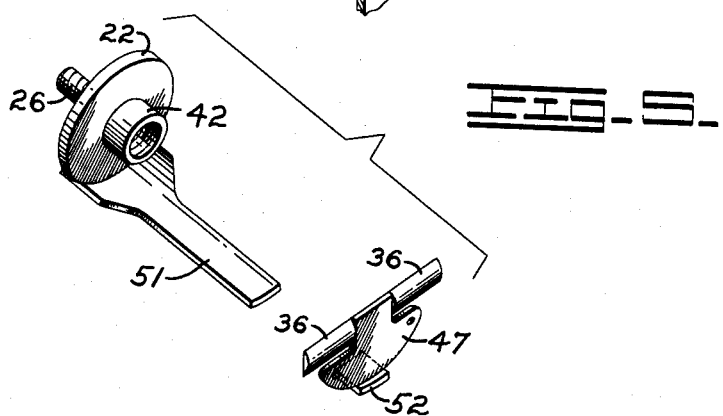
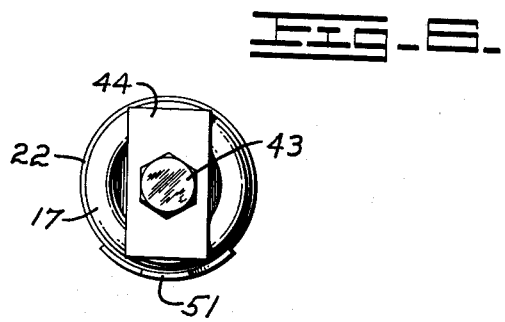
INVENTOR.
JOHN R. GARDNER
BY Charles M. Fryer
ATTORNEY

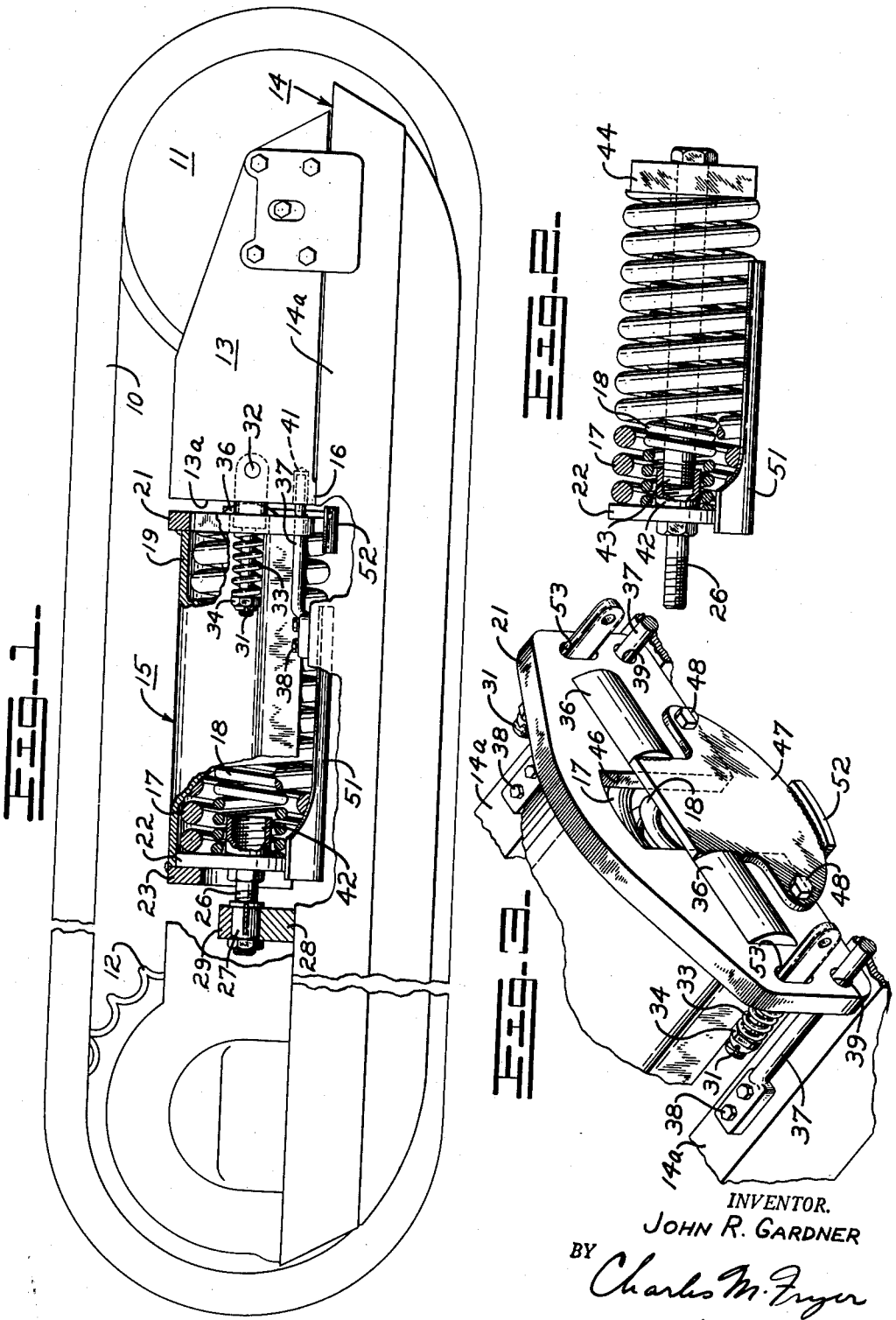

United States Patent Office 2,717,813
Patented Sept. 13, 1955

2,717,813

RECOIL SPRING MOUNTING FOR TRACK-TYPE TRACTOR

John R. Gardner, Murray, Utah, assignor to Caterpillar Tractor Co., Peoria, Ill., a corporation of California Application February 16, 1954, Serial No. 410,525

8 Claims. (Cl. 305—9)

This invention relates to resilient mountings for tractor track idlers and more specifically to a mounting designed to avoid breakage of the recoil spring mechanism.

In a tractor of the endless track-type, it is customary that the track be trained over a driving sprocket usually disposed to the rear, an idler forwardly disposed, and a number of supporting track rollers between the sprocket and idler and all rotatably supported on a truck frame. The idler is also adapted for longitudinal sliding movement relative to the truck frame and is resiliently urged away from the driving sprocket to maintain the track under tension, as well as to permit the idler to move toward the sprocket in the event that foreign material becomes lodged in the inside of the track. Conventional connecting means between the idler and the truck frame includes a plurality of springs preloaded by means of a long threaded bolt adapted for engagement with opposite ends of said springs. As the tractor is operated over rough terrain, this long bolt is subjected to low frequency vibrations causing breakage of the bolt which is difficult and costly to replace.

It is the object of this invention to overcome the disadvantages herein referred to by providing a resilient spring mounting wherein the center bolt is employed only as an assembly tool and not as an integral part of the tractor.

A further object of this invention is to permit limited vertical movement of the idler with respect to the truck frame to prevent overstressing of the various components of the mechanism.

Further objects and advantages of the invention are made apparent in the following specification wherein the invention is described in detail by reference to the accompanying drawings.

In the drawings:

Fig. 1 is a view in side elevation of a portion of the track laying mechanism of a track-type tractor in which the front idler shown is illustrated as provided with a mounting constructed in accordance with the present invention;

Fig. 2 is a view of the idler recoil springs with the center bolt in position for assembling the springs on the truck frame;

Fig. 3 is an isometric view of a portion of the truck frame with parts broken away to illustrate the means for securing the idler to the springs;

Fig. 4 is an isometric view of a portion of the truck frame with parts broken away to show the means for securing the recoil springs to the truck frame;

Fig. 5 is an isometric view of the recoil spring guides; and

Fig. 6 is an end view of the springs as shown in Fig. 2.

In Fig. 1 of the drawings a portion of one of the track laying mechanisms of a conventional track-type tractor is illustrated as comprising an endless track schematically shown at 10, an idler 11, and a drive sprocket 12. The idler 11 is carried in a bifurcated yoke member 13 adapted for sliding engagement with a truck frame 14 of the tractor. A recoil spring mechanism generally indicated at 15 is interposed between the idler yoke 13 and the truck frame 14 to maintain the tracks 10 in tension, so that when foreign material becomes lodged between the track and the idler or drive sprocket, the yoke member 13 and its associated idler 11 moves toward the drive sprocket to permit passage of the foreign material without damaging effect to the track links.

The idler 11 is also arranged for restricted vertical displacement in that the yoke 13 associated therewith is adapted to be rocked slightly about a heel portion indicated at 16 of said yoke. Resilient bearing means (not shown) are usually provided at the idler end of said yoke to cushion the yoke during its movement relative to the said truck frame 14.

The recoil spring mechanism 15 is disclosed as comprising a pair of concentrically mounted compression springs 17 and 18 contained in a preloaded condition within a housing or shroud 19. One end of said springs 17 and 18 abut the inner face of an end plate 21 secured to said shroud 19 and the other end of said springs abut a retaining plate 22 which in turn engages the inner face of a second end plate 23 of said shroud 19.

The recoil spring assembly is secured to the truck frame 14 by means of a track adjusting bolt 26 integrated with the rear face of retaining plate 22. The bolt 26 is carried in a threaded split collar 27 retained in an upstanding split bearing 28 supported with relation to the frame as shown in Fig. 4. A bearing cap 29 is effective to compress the split collar 27 against the threads of bolt 26.

To enable yoke member 13 to oscillate with respect to the recoil mechanism 15, as when the tractor is traveling over rough terrain, a pair of rockers 36 are shown as being interposed between the rear faces 13a of the yoke and the front face of plate 21 of the shroud 19. In order to maintain rockers 36 in abutment with the yoke 13, during the various positions assumed by idler 11 during its restricted vertical movement, a pair of centering bolts 31 are provided and are disclosed as being pivotally secured to each wall of yoke 13 as by pins 32. A pair of compression springs 33 are retained on centering bolts 31 by suitable nuts 34 so that the preload of springs 33 is effective to maintain the recoil mechanism in contact with the yoke.

Yoke 13 and its associated idler 11 is guided during its reciprocatory movement as described by a pair of guide bars 37 shown as being rigidly secured to the spaced truck frame members 14a as by bolts 38. The guide bars extend through enlarged openings 39 in end plate 21 and into enlarged bores 41 in the rear face of the yoke 13.

To assemble the recoil spring mechanism as illustrated in Fig. 2, springs 17 and 18 are centered around a protruding internally threaded hub portion 42 secured to the front face of plate 22 and are compressed to a desired preloaded condition by means of a long bolt 43 and rectangular washer 44. Said bolt engages the internal threads of the hub portion 42. Both the bolt and washer 44 are used for assembly purposes only.

With springs 17 and 18 compressed to a predetermined length, the shroud 19 is positioned over the springs as previously described and bolt 43 and its associated rectangular washer 44 are removed through a suitable opening 46 provided in end plate 21 (see Fig. 3).

As seen in Fig. 3, a plate 47 is rigidly secured to the front face of end plate 21 as by bolts 48. Rockers 36 integral with plate 47 abut rear face 13a of the yoke to provide a fulcrum about which the yoke rocks when idler 11 moves upwardly.

Recoil springs 17 and 18 are prevented from moving downwardly through the open bottom of cover or shroud member 19 by a longitudinally extending plate 51 carried on retaining plate 22 and a short longitudinally disposed plate 52 carried on plate 47 and best shown in Fig. 5.

The described recoil spring mechanism is attached to the tractor in the following manner. The centering bolts 31 pivotally secured to yoke 13 are threaded through enlarged openings 53 in end plate 21 of shroud 19. Split collar 27 is threaded on bolt 26 and said collar 27 is nested within the split bearing member 28. Bearing cap 29 is attached to bearing member 28 as by bolts 29a. Stabilizing bars 37 are positioned in end plate 21 and yoke 13 in enlarged holes 39 and 41 provided respectively therein, and said stabilizing bars are rigidly secured to the track frames 14a by bolts 38 as previously described after which the track chain is assembled in the usual manner.

Springs 33 and nuts 34 are installed about centering bolts 31 to resiliently urge rockers 36 into contact with the rear wall 13a of yoke 13.

Collar 27 is rotated to position the complete recoil spring mechanism for most effective operation in absorbing shocks imparted to the idler during various operations and bearing cap 29 is securely tightened to cinch said split threaded collar against the threads of bolt 26 to hold it in the desired position.

In operation, when foreign material becomes lodged between the idler and the track, the idler may be displaced toward drive sprocket 12, compressing springs 17 and 18. Upon release of the obstruction causing this condition, springs 17 and 18 will move idler 11 away from drive sprocket 12 to tension the track chain 10 suitably as determined by the preload condition of springs 17 and 18.

With the tractor operating over rough terrain, slight vertical displacement to the idler is imparted, and the spring recoil mechanism is effective to maintain a relatively constant tensional load on the chain by virtue of rockers 36, centering bolts 31 and stabilizing rods 37 without imparting damaging loads to the recoil spring mechanism or the tractor chain. Since there is no through bolt forming a connection between the yoke and the bearing 28, this invention obviates the difficulties resulting from breakage of such bolts. As the shroud which the recoil spring is made in two separable or telescoping parts there is freedom of movement between plates 22 and 23 in effect protects the short bolt 26 against fatiguing.

I claim:

1. In a recoil spring mechanism for a tractor track idler a plurality of springs, a shroud substantially surrounding said springs, connecting means to resiliently secure said shroud to said idler, and means to adjustably secure said recoil springs to the tractor truck frame.

2. In a recoil spring mechanism for a tractor track idler a plurality of springs confined in a preloaded condition with an external restricting means comprising a shroud substantially surrounding said springs, connecting means to resiliently secure said shroud to said idler, and means to adjustably secure said recoil springs to the tractor truck frame.

3. In a recoil spring mechanism for a tractor track idler a plurality of springs confined in a preloaded condition within an external restricting means comprising a shroud substantially surrounding said springs; said shroud being capable of being telescoped upon movement of said idler toward the drive sprocket to permit passage thereby of any foreign matter lodged between said idler and the track chain, connecting means to resiliently and secure said shroud to said idler, and means to adjustably secure said recoil springs to the tractor truck frame.

4. In a recoil spring mechanism for a tractor track idler a plurality of springs confined in a preloaded condition within an external restricting means comprising a shroud substantially surrounding said springs, said shroud being capable of being telescoped upon movement of said idler toward the drive sprocket to permit passage thereby of any foreign matter lodged between said idler in the track chain, connecting means to resiliently secure said shroud to said idler comprising a pair of spaced rods pivotally secured to a yoke portion of said idler and connected as by compression spring to said shroud, and means to adjustably secure said recoil springs to the tractor truck frame.

5. In a recoil spring mechanism for a tractor track idler a plurality of springs confined in a preloaded condition within an external restricting means comprising a shroud substantially surrounding said springs, said shroud being capable of being telescoped upon movement of said idler toward the drive sprocket to permit passage thereby of any foreign matter lodged between said idler and the track chain, connecting means to resiliently secure said shroud to said idler comprising a pair of spaced rods pivotally secured to a yoke portion of said idler and connected as by compressed springs to said shroud, and means to adjustably secure said recoil springs to the tractor truck frame comprising a rotatable member to axially shift said recoil mechanism against said idler to tension said track chain.

6. In a recoil spring mechanism for a tractor track idler a plurality of springs confined in a preloaded condition within an external restricting means comprising a shroud substantially surrounding said springs, said shroud being capable of being telescoped upon movement of said idler toward the drive sprocket to permit passage thereby of any foreign matter lodged between said idler and the track chain, connecting means to resiliently secure said shroud to said idler comprising a pair of spaced rods pivotally secured to a yoke portion of said idler and connected as by compressed springs to said shroud, said shroud comprising rocking means abutting said yoke member to permit limited vertical deflection of said yoke and idler, and means to adjustably secure said recoil springs to the tractor truck frame, said adjusting means comprising a rotatable member to shift said recoil mechanism and said idler axially to tension said track chain.

7. In a recoil spring mechanism for a tractor track idler a plurality of springs confined in a preloaded condition within an external restricting means comprising a shroud substantially surrounding said springs, said shroud being capable of being telescoped upon movement of said idler toward the drive sprocket to permit passage thereby of any foreign matter lodged between said idler and the track chain, said shroud being carried on a pair of spaced parallel guide bars fixed to said truck frame to stabilize said shroud during its telescopic movement, connecting means to resiliently secure said shroud to said idler comprising a pair of spaced rods pivotally secured to a yoke portion of said idler and connected as by compressed springs to said shroud, said shroud comprising rocking means abutting said yoke member to permit limited vertical deflection of said yoke and idler, and means to adjustably secure said recoil springs to the tractor truck frame, said adjusting means comprising a rotatable member to shift said recoil mechanism and said idler axially to tension said track chain.

8. In a recoil spring mechanism for a tractor track idler a plurality of springs confined in a preloaded condition within an external restricting means comprising a shroud substantially surrounding said springs, said springs being preloaded by the use of a removable member in the form of a long threaded bolt engageable with a threaded portion of said shroud to compress said springs therebetween and adapted for removal therefrom upon compressing said springs through suitable apertures in said shroud, said shroud being capable of being telescoped upon movement of said idler toward the drive sprocket to permit passage thereby of any foreign matter lodged between said idler and the track chain, said shroud being carried on a pair of spaced parallel guide bars fixed to said truck frame to stabilize said shroud during its telescopic movement, connecting means to resiliently secure said shroud to said idler comprising a pair of spaced rods pivotally secured to a yoke portion of said idler and connected as by compressed springs to said shroud, said shroud comprising rocking means abutting said yoke member to permit limited vertical deflection of said yoke and idler, and means to adjustably secure said recoil springs to the tractor truck frame, said adjusting means comprising a rotatable member to shift said recoil mechanism and said idler axially to tension said track chain.

References Cited in the file of this patent

UNITED STATES PATENTS

| | | |
|---|---|---|
| 1,906,610 | Jett | May 2, 1933 |
| 2,284,821 | Heaslet | June 2, 1942 |
| 2,506,619 | Schwartz | May 9, 1950 |